United States Patent
Poletti et al.

(10) Patent No.: US 11,983,610 B2
(45) Date of Patent: May 14, 2024

(54) CALCULATING DECISION SCORE THRESHOLDS USING LINEAR PROGRAMMING

(71) Applicant: PayPal, Inc., San Jose, CA (US)

(72) Inventors: Chiara Poletti, San Jose, CA (US); Hanlin Wu, San Jose, CA (US); Xing Ji, San Jose, CA (US); Moein Saleh, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 683 days.

(21) Appl. No.: 16/709,504

(22) Filed: Dec. 10, 2019

(65) Prior Publication Data

US 2021/0174247 A1   Jun. 10, 2021

(51) Int. Cl.
*G06N 20/00* (2019.01)
*G06F 16/22* (2019.01)

(52) U.S. Cl.
CPC ............. *G06N 20/00* (2019.01); *G06F 16/22* (2019.01)

(58) Field of Classification Search
CPC ..... G06N 20/00; G06F 16/22; G06Q 20/4016
USPC ......................................................... 705/35
See application file for complete search history.

(56) References Cited

U.S. PATENT DOCUMENTS

| | | | |
|---|---|---|---|
| 5,930,762 A | 7/1999 | Masch | |
| 10,552,837 B2* | 2/2020 | Jia et al. | G06Q 20/4016 |
| 2014/0149128 A1* | 5/2014 | Getchius | G06Q 50/22 |
| 2014/0149129 A1 | 5/2014 | Getchius | |
| 2014/0149130 A1 | 5/2014 | Getchius | |
| 2018/0285878 A1* | 10/2018 | Jayanti et al. | G06Q 20/40 |
| 2019/0026742 A1* | 1/2019 | Nanduri et al. | G06Q 20/4016 |
| 2019/0087821 A1* | 3/2019 | Jia et al. | G06Q 20/40 |
| 2020/0211022 A1* | 7/2020 | Allbright et al. | G06Q 20/40 |
| 2020/0314101 A1* | 10/2020 | Zhang et al. | H04L 29/06 |
| 2021/0073819 A1* | 3/2021 | Hernandez et al. | G06Q 20/4016 |
| 2021/0090085 A1* | 3/2021 | Kang et al. | G06Q 20/4016 |

(Continued)

OTHER PUBLICATIONS

Security engineering, Wikipedia; https://en.wikipedia.org/w/index.php?title=Security_engineering&oldid=1017168910; last edited on Apr. 11, 2021, 5 pages. [Retrieved Oct. 15, 2021].

(Continued)

*Primary Examiner* — Scott C Anderson
*Assistant Examiner* — George N. Proios
(74) *Attorney, Agent, or Firm* — Kowert, Hood, Munyon, Rankin & Goetzel, P.C.; Scott W. Pape; Dean M. Munyon

(57) ABSTRACT

A computer system is configured to receive a dataset that includes a plurality of transaction request records and is divisible into a plurality of segments. Each transaction request record includes an individual score calculated by a machine learning algorithm. The computer system also receives a plurality of constraints. The computer system is configured to calculate, using a linear programming algorithm, a decision threshold score for a particular segment of the plurality of segments using the transaction request records. The computer system is configured to provides access to the calculated decision threshold score to a production computer system. The production computer system is configured to use the decision threshold score to evaluate a subsequent transaction request corresponding to the particular segment.

20 Claims, 8 Drawing Sheets

(56) References Cited

U.S. PATENT DOCUMENTS

2021/0133789 A1\* 5/2021 Ghosh et al. .......... G06Q 30/02

OTHER PUBLICATIONS

Ross Anderson, Security Engineering: A Guide to Building Dependable Distributed Systems, 2nd edition, 0470068523, "Chapter 1: What Is Security Engineering?" (Apr. 14, 2008), pp. 3-15.

\* cited by examiner

| Account | Score | Region | Merchant | Activity | Amount | Date | Truth |
|---|---|---|---|---|---|---|---|
| 563535 | 885 | North | Large | 1 | $9,841 | 12/13 | TRUE |
| 863616 | 799 | East | Large | 5 | $4,952 | 12/10 | FALSE |
| 644126 | 978 | South | Very Large | 2 | $8,201 | 3/4 | TRUE |
| 698355 | 591 | South | Small | 8 | $4,141 | 3/18 | TRUE |
| 477369 | 877 | West | Medium | 7 | $4,643 | 12/5 | TRUE |
| 608118 | 245 | North | Large | 6 | $1,665 | 12/18 | TRUE |
| 439825 | 432 | East | Very Large | 8 | $1,995 | 12/24 | FALSE |
| 630646 | 755 | South | Medium | 1 | $7,191 | 11/2 | TRUE |
| 796952 | 997 | North | Small | 0 | $88 | 9/17 | TRUE |
| 695184 | 352 | East | Very Large | 4 | $4,059 | 10/15 | TRUE |
| 272270 | 302 | West | Medium | 2 | $4,528 | 3/30 | TRUE |
| 377100 | 280 | West | Small | 1 | $4,993 | 9/25 | FALSE |
| 593464 | 74 | EastNorth | Medium | 4 | $6,559 | 11/24 | TRUE |
| 422905 | 496 | South | Large | 4 | $554 | 2/28 | FALSE |
| 488608 | 547 | North | Small | 10 | $8,322 | 6/21 | TRUE |

FIG. 3

Overall Results
500

| | |
|---|---|
| Optimal Catch Rate | 52.46% |
| Optimal FPR | 2.43 |
| Optimal Decline Rate | 5.99% |

Segment-Level Results
510

| Segment | Optimal Operating Point | Optimal Catch Rate | Optimal FPR | Overall Bad Rate | % of Total Bad | % of Overall TPV | Optimal Cut-Off |
|---|---|---|---|---|---|---|---|
| Large_HR | 12.0% | 57.59% | 3.11 | 2.92% | 6.07% | 4.0% | 315.55 |
| Large_MR | 1.0% | 18.81% | 3.89 | 0.2% | 7.54% | 23.08% | 739.82 |
| Medium_HR | 7.0% | 48.68% | 1.97 | 2.36% | 16.48% | 11.34% | 503.82 |
| Medium_MR | 2.0% | 26.74% | 4.07 | 0.39% | 11.27% | 25.46% | 753.66 |
| Small_HR | 21.0% | 65.85% | 2.19 | 6.58% | 54.25% | 18.08% | 446.68 |
| Small_MR | 1.0% | 17.95% | 5.86 | 0.15% | 4.4% | 18.04% | 857.53 |

CALCULATING DECISION SCORE THRESHOLDS USING LINEAR PROGRAMMING

BACKGROUND

Technical Field

This disclosure relates generally to evaluating transaction requests received by a computer system using a machine learning algorithm.

Description of the Related Art

In order to evaluate incoming transaction requests and determine whether to grant transaction requests, computer systems use machine learning algorithms that have been trained on previously-received transaction requests to score the incoming transaction request. If the score calculated by the machine learning algorithm is on one side of a decision threshold score, then the computer system grants the transaction request, but if the score is on the other side of the decision threshold score, the computer system declines the transaction request.

BRIEF DESCRIPTION OF THE DRAWINGS

FIG. 3 is an example dataset of FIG. 1 in accordance with various embodiments.

FIGS. 5A and 5B are tables showing exemplary results of an exemplary segment-level optimization of decision threshold scores for a particular database in accordance with the disclosed embodiments.

Figure 1:
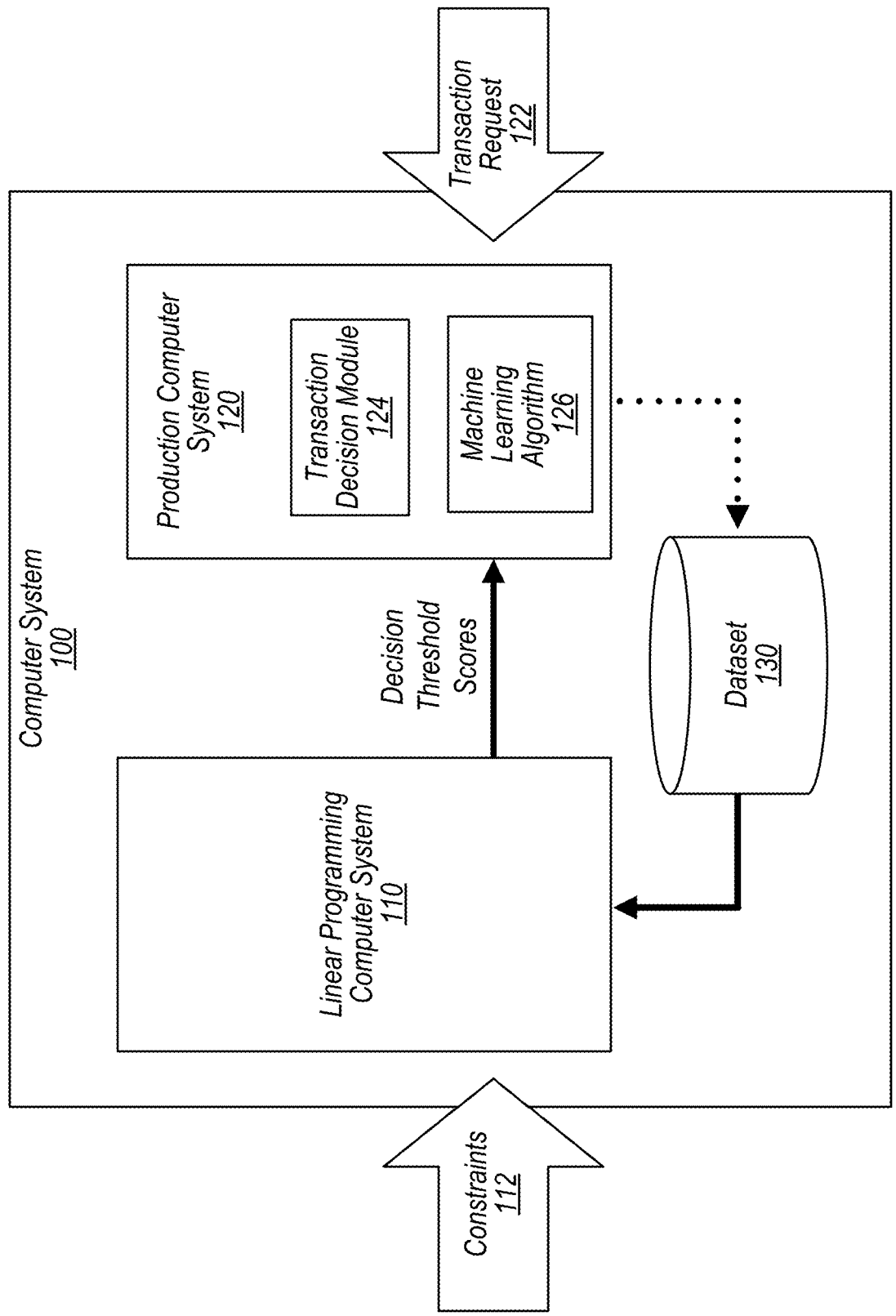
FIG. 1 is a block diagram illustrating an embodiment of a computer system configured to calculate a segment-level decision threshold score based on constraints and to evaluate a transaction request using the segment-level decision threshold score.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive a transaction request" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed field programmable gate array (FPGA), for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" transaction requests would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram is depicted illustrating an embodiment of a computer system 100 configured to calculate a segment-level decision threshold score based on constraints 112 and to evaluate a transaction request 122 using the segment-level decision threshold score. Computer system includes a linear programming computer system 110, a production computer system 120, and a dataset 130.

In various embodiments, computer system 100 is any of a number of computers, servers, or cloud platforms that are configured to implement linear programming computer system 110, production computer system 120, and dataset 130. In various embodiments, computer system 100 is a dedicated computer system for the service provider, but in other embodiments computer system 100 is implemented in a distributed cloud computing platform. In various embodiments, computer system 100 implements linear programming computer system 110, production computer system 120, and dataset 130 on the same hardware (e.g., the same server or could of servers). In other embodiments, computer system 100 implements linear programming computer system 110, production computer system 120, and/or dataset 130 on separate hardware (e.g., separate servers or clouds of servers for each). In some embodiments, linear programming computer system 110, production computer system 120, and/or dataset 130 are implemented on hardware that is remote from one another (e.g., at separate datacenters), but in other embodiments linear programming computer system 110, production computer system 120, and dataset 130 are implemented locally (e.g., at the same datacenter). In some embodiments, linear programming computer system 110 and production computer system 120 are implemented by separate computer systems that are managed by different entities, but in other embodiments linear programming computer system 110, production computer system 120, and dataset 130 are managed by the same entity (e.g., PAYPAL). In various embodiments, computer system 100 is configured to perform various operations discussed herein with references to FIGS. 2-7.

Linear programming computer system 110 is configured to receive constraints 112 and, using constraints 112, analyze dataset 130 to calculate segment-level decision threshold scores.

In various embodiments, linear programming computer system 110 is operable to receive dataset 130 and constraints 112, calculate a decision threshold score for a particular segment of the dataset 130 using a linear integer programming algorithm to identify a decision threshold score for the particular segment according to constraints 112, and provide access to the decision threshold score for the particular segment to production computer system 120. As used herein, "provide access to the decision threshold score" includes sending the decision threshold score to production computer system 120 in one or more messages and/or storing the decision threshold score in a location that is accessible to production computer system 120 (e.g., network storage). While linear programming computer system 100 uses a linear integer programming algorithm in some embodiments, in other embodiments a linear programming algorithm can be used none of the variables are required to be integers. Linear programming computer system 110 is discussed in further detail herein in connection to FIGS. 2, 5A, 5B, and 6.

In various embodiments, each constraint 112 is a condition that must be satisfied by the solution (e.g., a decision threshold score) calculated by linear programming computer system 110. In various embodiments, each of constraints 112 is an equality constraint (e.g., X=Y), an inequality constraint (e.g., X>Y, X<Y), or an integer constraint (e.g., X must be an integer). The set of candidate solutions (e.g., candidate decision threshold scores) that satisfy all constraints is called the "feasible set." Accordingly, constraints 112 define the feasible set of solutions, and through the use of linear programming, an optimal solution can be calculated from the feasible set.

In various embodiments, production computer system 120 is configured to run transaction decision module 124, which is operable to automatically determine, using a machine learning algorithm 126, whether to grant transaction requests 122 based on one or more decision thresholds scores calculated by linear programming computer system 110. Production computer system 120 is configured to receive transaction request 122, calculate a score for the received transaction request 122 using machine learning algorithm 126, and determine whether to grant the received transaction request 122 based on the score for the revived transaction request 122 and the decision threshold score corresponding to the received transaction request 122. In various embodiments, transaction request 122 is of a particular type that corresponds to a particular segment of dataset 130 (e.g., a transaction request 122 associated with the North region when dataset 130 is divisible into segments by North, South, East, and West geographic region). In such embodiments, production computer system 120 is configured to use the decision threshold score corresponding to the particular type of the transaction request 122 (e.g., the decision threshold score calculated for the segment of dataset 130 corresponding to the particular type).

In various embodiments, transaction request 122 is a request to perform a transaction that may (or may not) be granted by production computer system 120 upon evaluation. As discussed herein, transaction request 122 is of a type that corresponds a segment of dataset 130. In various embodiments, transaction request 122 is a request to engage in a financial transaction such as a purchase, a bank account transfer, or a loan application. In other embodiments, however, transaction request 122 is not a financial transaction and may be, for example, a request to access secured digital or paper files, a request to access a secured physical area, or a request to join a secured group (e.g., a group having a higher level of security clearance such as Top Secret relative to a larger population).

In various embodiments, production computer system 120 uses machine learning algorithm 126 to calculate a score for a received transaction request 122. Machine learning algorithm 126 may be any of a number of classification machine learning algorithms executable to be trained using a dataset (e.g., dataset 130, other datasets) to calculate a score (e.g., a risk score, a credit score) for the transaction request 122 according to various factors (e.g., originating location, account information, date, etc.) of the transaction request 122. As discussed herein, in various embodiments machine learning algorithm 126 is executable to calculate a risk score reflecting the predicted legitimacy of transaction request 122. In various embodiments, a higher score reflects a higher predicted legitimacy likelihood, although in other embodiments, the opposite is true such that a lower score reflects a higher predicted legitimacy likelihood. In various embodiments, production computer system 120 compares the score generated for transaction request 122 to the corresponding decision threshold score to determine whether to grant the transaction request 122 (e.g., by granting transaction request 122 because its score is above the decision threshold score, or by granting transaction request 122 because its score is below the decision threshold score).

In various embodiments, dataset 130 includes a plurality of transaction request records that have been received prior to transaction request 122. These transaction request records include individual scores for the respective transaction requests that were previously calculated by machine learning algorithm 126. As used herein, "each transaction request record [of the plurality of transaction request records] includes an individual score" means that, within dataset 130, there exists two or more transaction request records that include scores. It is contemplated, however, that dataset 130 might also include other transaction request records that do not include such scores in various embodiments. Accordingly, the term "each" does not necessarily apply to every transaction request record in dataset 130.

In various embodiments, dataset 130 is a training dataset that includes a "truth label" indicative of whether the transaction request should be granted (e.g., a transaction request record marked as fraudulent should not be granted). As discussed herein, a transaction request record that is associated with a truth label that indicates the transaction request should not be granted is also referred to as being "labeled bad." As used herein a "truth label" does not necessarily mean that the label is the absolute truth, but merely that the record has been marked with the label. For example, a record can be marked as fraudulent based on a report from a user about an account takeover that resulted in unapproved transaction requests. In such an instance, the truth label reflects that this user report has been made, but does not necessarily reflect the veracity of the user report itself (e.g., a user reports of an account takeover may be accidentally submitted and therefore not actually reflect an account takeover, but the corresponding transaction request will be marked as fraudulent because the user report was submitted). Dataset 130 is discussed in further detail in reference to FIGS. 2 and 3 herein.

In various instances, wrongly rejecting transaction requests that should be granted or granting transaction requests that should be rejected can degrade performance of production computer system. For example, in various embodiments, rejecting a transaction request results in asking the submitter of the request to provide additional information about the transaction request (e.g., by asking for additional verification information such as a password or an additional authentication factor). Accordingly, if a transaction request that should be granted is initially rejected, time and computational resources are unnecessarily spent on verification, thus decreasing performance of production computer system 120 in terms of resource utilization (e.g., memory utilization) and throughput. Conversely, granting a transaction request that should not have been granted may result in exposing protected information to entities that should have access, financial losses due to issuing refunds, or other costs that also decrease performance of production computer system 120 in various instances.

As discussed herein, calculating segment-level decision threshold scores may permit computer system 100 to improve the performance of production computer system 120 in its evaluation of transaction requests 122. Further, in various embodiments, such a performance improvement may be accomplished without adjusting and/or retraining the machine learning algorithm 126. In various instances, dataset 130 is divisible into segments. Accounting for these segments and setting decision threshold scores for the segments can improve the performance of production computer system 120 by, for example, increasing the percentage of transaction requests 122 that are correctly granted or rejected. For example, if the decision threshold score were set the same for all segments, performance might be reduced in some instances. For example, an unacceptable number of transaction requests corresponding to a first segment might be incorrectly rejected and an unacceptable number of transaction requests corresponding to a second segment might be incorrectly rejected. Improving the performance of production computer system 120 enables faster processing of transaction requests without unduly increasing risks to the production computer system 120 (e.g., risks of exposing secured files, risks of financial losses, etc.).

The ability to set different decision score thresholds for different segments enables production computer system 120 to account for differences between the different segments. Further, because the different decision score thresholds are calculated using a linear programming algorithm according to constraints 112, the segment-level decision threshold scores may be set in a systematic way to identify the optimal (or near optimal) segment-level decision threshold scores according to constraints 112. In this instance, a particular segment-level decision score threshold is "optimal" if it is the maximum decision threshold score (or minimum decision threshold score in alternative embodiments) in the feasible set for the particular segment. Setting segment-level decision threshold scores enables computer system 100 to respond to idiosyncrasies in a particular segment without modifying the machine learning algorithm 126. For example, this allows for setting different threshold scores for transaction requests 122 associated with different dates to account for seasonal variations or with different regions to account for regional variations. Moreover, the granularity of segment-level decision threshold scores can be set depending on the granularity of the segmentation of dataset 130 (e.g., dividing dataset 130 into segments by region, date, and activity level of account as discussed in connection to FIG. 3). While calculating tens or hundreds of segment-level decision thresholds may be computationally expensive for linear programming computer system 110, this computational expense may further improve the performance of production computer system 120 by increasing both throughput and accuracy in various instances.

Figure 2:
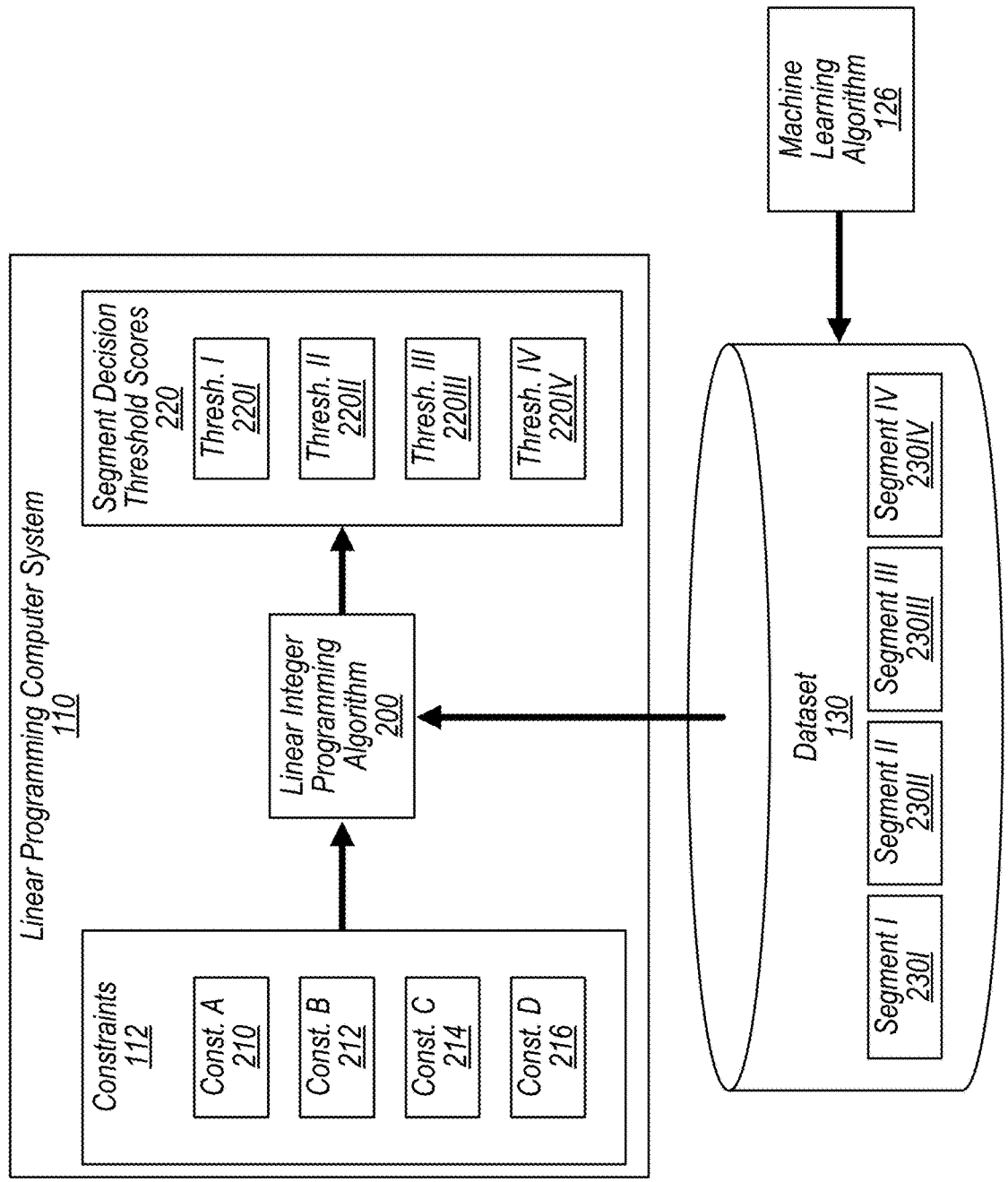
FIG. 2 is an expanded block diagram of the linear programming computer system and dataset of FIG. 1 in accordance with various embodiments.

Referring now to FIG. 2, an expanded block diagram illustrating additional detail about linear programming computer system 110 and dataset 130 is depicted. In various embodiments, linear programming computer system include a linear integer programming algorithm module 200 that determines various segment decision threshold scores 220 based on the various segments 230 according to constraints 112.

In various embodiments, dataset 130 is divisible into a plurality of segments. For example, in the embodiment depicted in FIG. 2, dataset 130 is divisible into four segments: segment I 230I, segment II 230II, segment III 230III, and segment IV 230IV. For example, these various segments 230 each include respective transaction request records that are associated with respective different geographic locations (e.g., North, South, East, and West regions). Examples of how dataset 130 can be divided into segments are discussed further herein in connection to FIG. 3. As discussed herein, a plurality of transaction request records stored in dataset 130 have been given a score by machine learning algorithm 126. In various embodiments, after a transaction request 122 is received and evaluated, the received transaction request 122 is added to dataset 130. In some of such embodiments, the segment-level decision threshold scores discussed herein are re-calculated after transaction requests 122 are added to the dataset 130. For example, in various embodiments, such recalculations are performed in response to transaction requests 122 being added to dataset 130 (e.g., every time a transaction request 122 is added to dataset 130, in response to every $100^{th}$ transaction request 122 that is added to dataset 130). In other embodiments, such recalculations are performed periodically (e.g., every day, every week, every month, etc.).

In various embodiments, linear programming computer system 110 receives a plurality of constraints 112. In the embodiment shown in FIG. 2, four constraints 112 have been received: constraint A 210, constraint B 212, constraint C 214, and constraint D 216, for example. In various embodiments, constraints 112 include an overall transaction request decline rate, a segment transaction request decline rate for one or more segments 230, an overall catch rate, a segment catch rate for one or more segments 230, an overall false positive rate, a segment false positive rate for one or more segments 230, or any combination. In various embodiments, these constraints 112 are equality or inequality constraints. In various embodiments, segment-level constraints for some segments such as segment decline rate, segment catch rate, and segment false positive rate may be weighted relative to other segments. Such weighting may be done, for example, by a portion of dataset 130 (e.g., a row or column). In some embodiments, for example, transaction requests are associated with values (e.g., an importance of a secure file or location to which access is requested, a monetary value of a financial transaction, etc.) and segments 230 associated with relatively higher values are weighted more heavily than segments 230 associated with relatively lower values.

"Transaction request decline rate" (also referred to herein as "decline rate") is defined herein as the percentage of transaction requests that would be rejected as a result of a particular decision threshold score being using to evaluate the various transaction request records in dataset 130. For example, if a particular segment 230 includes 100 transaction request records and 80 of these have been scored 800 or greater by machine learning algorithm 126 and the decision score threshold is set at 800, then the decline rate for the particular segment 230 will be 20%. The overall decline rate is the average decline rate across the dataset when various segment-level decision threshold scores are used, and segment-level decline rate is the decline rate that is acceptable for a particular segment 230. For example, a user may specify constraints 112 that overall decline rate is <6% and segment-level decline rate is <12%. Accordingly, the solution calculated by linear programming computer system 110 will satisfy both constraints 112 (i.e., the overall decline rate for the optimal decision threshold scores 220 is 5.5% and the segment decline rates range between 2% and 10%).

"Catch rate" is defined herein as the percentage of transaction requests that are labeled bad that would be properly rejected as a result of a particular decision threshold score being using to evaluate the various transaction request records in dataset 130. For example, in various embodiments where transaction requests are declined if they are score abode the decision threshold score, if a particular segment 230 includes 100 transaction request records, if a particular segment 230 includes 100 transaction request records, 50 transaction request records have been labeled bad, and 30 of the labeled bad transaction request records have been scored less than 800 by machine learning algorithm 126, and the decision score threshold is set at 800, then the catch rate for the particular segment 230 will be 40% (i.e., 20 [properly rejected transaction requests] divided by 50 [total number of transaction request records that have been labeled bad]). The overall catch rate is the average catch rate across the dataset when various segment-level decision threshold scores are used, and segment-level catch rate is the catch rate that is acceptable for a particular segment 230. For example, a user may specify constraints 112 that overall catch rate is <40% and segment-level catch rate is <30%. Accordingly, the solution calculated by linear programming computer system 110 will satisfy both constraints 112 (i.e., the overall catch rate for the optimal decision threshold scores 220 is 45% and the segment decline rates range between 30% and 60%).

"False positive rate" (FPR) is defined herein as the rate of transaction request records that are not labeled bad but are nonetheless rejected as a result of a particular decision threshold score being using to evaluate the various transaction request records in dataset 130. In various embodiments, false positive rate is the number of transaction request records that are not labeled bad but are rejected per the number of transaction request records that are labeled bad that are properly rejected. Thus, if setting a particular decision threshold score is used when evaluating a particular segment 230 and 3 transaction request records that are not labeled bad are rejected per 1 transaction request record that is labeled bad is rejected, the FPR will be 3.0. The overall FRP is the average FRP across the dataset when various segment-level decision threshold scores are used, and segment-level FRP is the FRP that is acceptable for a particular segment 230. For example, a user may specify constraints 112 that overall FRP is <4 and segment-level FRP is <7. Accordingly, the solution calculated by linear programming computer system 110 will satisfy both constraints 112 (i.e., the overall FRP for the optimal decision threshold scores 220 is 2.9 and the segment FRPs range between 2 and 6.5).

In various embodiments, linear programming computer system 110 includes linear integer programming algorithm 200. As discussed herein, linear integer programming algorithm 200 is executable to identify, for one or more segments 230, a segment decision threshold score 220 using linear integer programming. As used herein, "linear programming" refers to a method to achieve the best outcome (e.g., maximum decision threshold score 220, minimum decision threshold score 220) in a mathematical model whose requirements are represented by linear constraints 112. It will be understood that linear programming is a technique for the optimization of a linear objective function, subject to constrains 112 that define linear equality and/or linear inequality requirements (e.g., decline rate <6%, false positive rate <4, catch rate >50%). As discussed herein, constraints 112 define a feasible set, and linear programming is used to select the member of the feasible set that satisfies constraints 112. As used herein, "linear integer programming" is a subset of linear programming in which some or all of the variables are restricted to be integers.

Because determining the solution to a linear integer programming problem is NP-Complete, the amount of computation time needed to calculate the decision threshold scores 220 increases rapidly as the size of the problem increases (e.g., as dataset 130 increase in size, as the number of segments 230 increase). Accordingly, in various embodiments linear integer programming algorithm 200 is used to address this NP-Complete problem using heuristic methods and/or approximation algorithms. In various embodiments, linear integer programming algorithm 200 employs one or more of the following techniques to calculate the segment decision threshold scores: approximation (i.e., searching for a solution that is at most a factor from an optimal solution rather than the optimal solution itself), randomization (i.e., try solutions randomly to increase running time), restriction (e.g., restrict the structure of inputs to solve the linear integer programming problem more quickly), parameterization (e.g., fix certain parameters to decrease running time), or heuristic techniques.

In various embodiments, linear integer programming algorithm 200 is executable to perform the optimization, for each particular segment, by using ranges of segment decision threshold scores as candidates (e.g., 1000 as a first candidate segment decision threshold score, 950 as a second candidate segment decision threshold score, etc.). Then, linear integer programming algorithm 200 is executable to project performance indicators for transaction request records corresponding to the particular segment for each of a plurality of candidate decision threshold scores that satisfy constraints 112 and identifying, as the decision threshold score 220 for the particular segment 230, the maximum (or minimum in other embodiments) candidate decision threshold score that satisfies constraints 112. For example, in various embodiments, if constraints 112 includes decline rate and catch rate constraints 112, linear integer programming algorithm 200 is executable to calculate, for each candidate segment decision threshold score, decline rates and catch rates.

In the embodiment shown in FIG. 2, linear integer programming algorithm module 200 outputs four segment decision threshold scores 220 that are associated with respective segments of dataset 130: threshold score I 220I corresponding to segment I 230I, threshold score II 220II corresponding to segment II 230II, threshold score III 220III corresponding to segment III 230III, and threshold score IV 220IV corresponding to segment IV 230IV. As discussed herein, linear programming computer system 110 provides access to the segment decision threshold scores 220 to production computer system 120, which is configured to use these segment threshold scores 220 when evaluating a subsequent transaction request 122 that corresponds to a particular segment (e.g., segment I 230I, segment II 230II, segment III 230III, segment IV 230IV). As referred to herein, a transaction request 122 corresponds to a particular segment 230 by the transaction request 122 matching the characteristics that define the segment. For example, if the segments are defined by geographic region (e.g., North, South, East, West as shown in FIG. 3) a transaction request 122 corresponds the geographic region associated with the transaction request 122. In such embodiments, therefore, a transaction request associated with the North region would be evaluated with the segment decision threshold score for the North segment of dataset 130, for example.

Referring now to FIG. 3, an example of a dataset 130 is shown. The example dataset 130 shown in FIG. 3 is illustrated as a table with rows 300 and columns 302. Information contained in dataset 130 may include letters, numbers, or a combination in various embodiments. In the illustrated embodiment, each row 300 (including rows 304 and 306) corresponds to a particular transaction request and each column 302 corresponds to information about the transaction requests. In the embodiment shown in FIG. 3, there are eight columns 302: account column 310, score column 312, region column 314, merchant column 316, activity column 318, amount column 320, date column 322, and truth column 324. These columns 302 are merely examples, however, and there may be fewer columns in dataset 130 or more columns 302 storing additional information (e.g., additional geographic information, IP addresses, names associated with accounts and/or merchants). Further, while dataset 130 is shown as a table divided into rows and columns in FIG. 3 with rows corresponding to transaction request records and columns to attributes of these transaction request records, any other method of organizing dataset 130 can be used. Accordingly, while portions of dataset 130 are referred to herein as "rows" and "columns," these labels merely refer to various regions within dataset 130 containing related information. Further, the information comprising dataset 10 can be distributed among a plurality of datasets, tables, databases, etc. Additionally, while the transaction requests shown in FIG. 3 are associated with transaction requests that are associated with dollar amounts (e.g., amount column 320), the transaction requests may be of a non-monetary nature including but not limited to requests to access secured digital or paper files, requests to access a secured physical area, or requests to join a secured group (e.g., a group having a higher level of security clearance such as "Top Secret" relative to a larger population).

In various embodiments, dataset 130 includes account column 310. Account column 310 includes indicators of respective particular accounts associated with respective transaction request records (e.g., the account number of the account associated with the requester, a username of the account associated with the requester, etc.).

In various embodiments, dataset 130 includes score column 312. Score column 312 includes respective scores calculated by machine learning algorithm 126 for respective transaction request records. In some embodiments, the scores in score column 312 are between a set numerical range (e.g., from 0-1000) in which a score near one end of the numerical range (e.g., 0) indicates that machine learning algorithm 126 has predicted that the transaction request in question is good (e.g., the transaction request is legitimate, the applicant for credit is credit worthy) and a score near the other end of the numerical range (e.g., 1000) indicates that the machine learning algorithm 126 has predicted that the transaction request in question is bad (e.g., the transaction request is fraudulent, the application for credit is not credit worthy).

In various embodiments, dataset 130 includes region column 314. In various embodiments, region column 314 includes information indicative of a geographic region (e.g., continent, country, state, city, neighborhood, street address, postal code). In various embodiments, multiple region columns 314 can be used to store geographic information at various levels of generality (e.g., one region column 314 for a country name, a second region column for a state or province name, etc.).

In various embodiments, dataset 130 includes merchant column 316. In various embodiments, merchant column 316 includes information indicative of the merchant associated with the transaction request in question. In some embodiments, merchant column 316 includes information about an entity from which goods or services are being purchased in the transaction request in question.

In various embodiments, dataset 130 includes activity column 318. In various embodiments, activity column 318 includes information indicative of a level of activity associated with the account the is associated with the transaction request in question. In some of such embodiments, the information in activity column 318 are between a set numerical range (e.g., from 1-10) in which a score near one end of the numerical range (e.g., 1) indicates that the account has little to no account activity associated with it (e.g., the account is new and few transaction requests are associated with it) and a score near the other end of the numerical range (e.g., 10) indicates that the account has a long history of numerous transaction request. In some embodiments, the information in activity column 318 is calculated by a machine learning algorithm based on the account histories associated with the account and other accounts (e.g., accounts with similar characteristics).

In various embodiments, dataset 130 includes amount column 320. In such embodiments, account column 320 includes information indicative of a financial amount associated with the transaction request in question (e.g., a purchase amount, an amount of funds to transfer between accounts, the amount of credit being applied for).

In various embodiments, dataset 130 includes date column 322. In such embodiments, date column includes information indicative of a date associated with the transaction in question (e.g., a date a purchase was made, a date on which access to a secure file is requested).

In various embodiments, dataset 130 includes truth column 324. In such embodiments, truth column 324 stores a truth label for the transaction in question. Truth labels are discussed in further detail in reference to FIG. 1 above.

Accordingly, for example, row 304 corresponds to a first past transaction request associated with account "563535," that has been given a score of 885 (e.g., by machine learning algorithm 240), that is associated with the "North" region, that is associated with a "Large" merchant, that has an activity score of 1, that is associated with an amount of "$9,841," that is dated 12/13, and is labeled "TRUE" (e.g., the transaction request is marked as being legitimate). Similarly, row 306 corresponds to a second past transaction request associated with account "863616," that has been given a score of 799 (e.g., by machine learning algorithm 240), that is associated with the "East" region, that is associated with a "Large" merchant, that has an activity score of 5, that is associated with an amount of "$4,952," that is dated 12/10, and is labeled "FALSE" (e.g., the transaction request is marked as being fraudulent). If dataset 130 shown in FIG. 3 is segmented by Region, for example, rows 304 and 306 would be grouped into different segments. But if dataset 130 shown in FIG. 3 is segmented by Merchant, as a second example, rows 304 and 306 would be grouped into the same segment. Similarly, dataset 130 can be divisible by levels of account activity in activity column 318 (e.g., a first segment for activity scores between 8-10, a second segment for activity scores between 5-7, and a third activity segment for activity scores between 1-4.).

Figure 4:
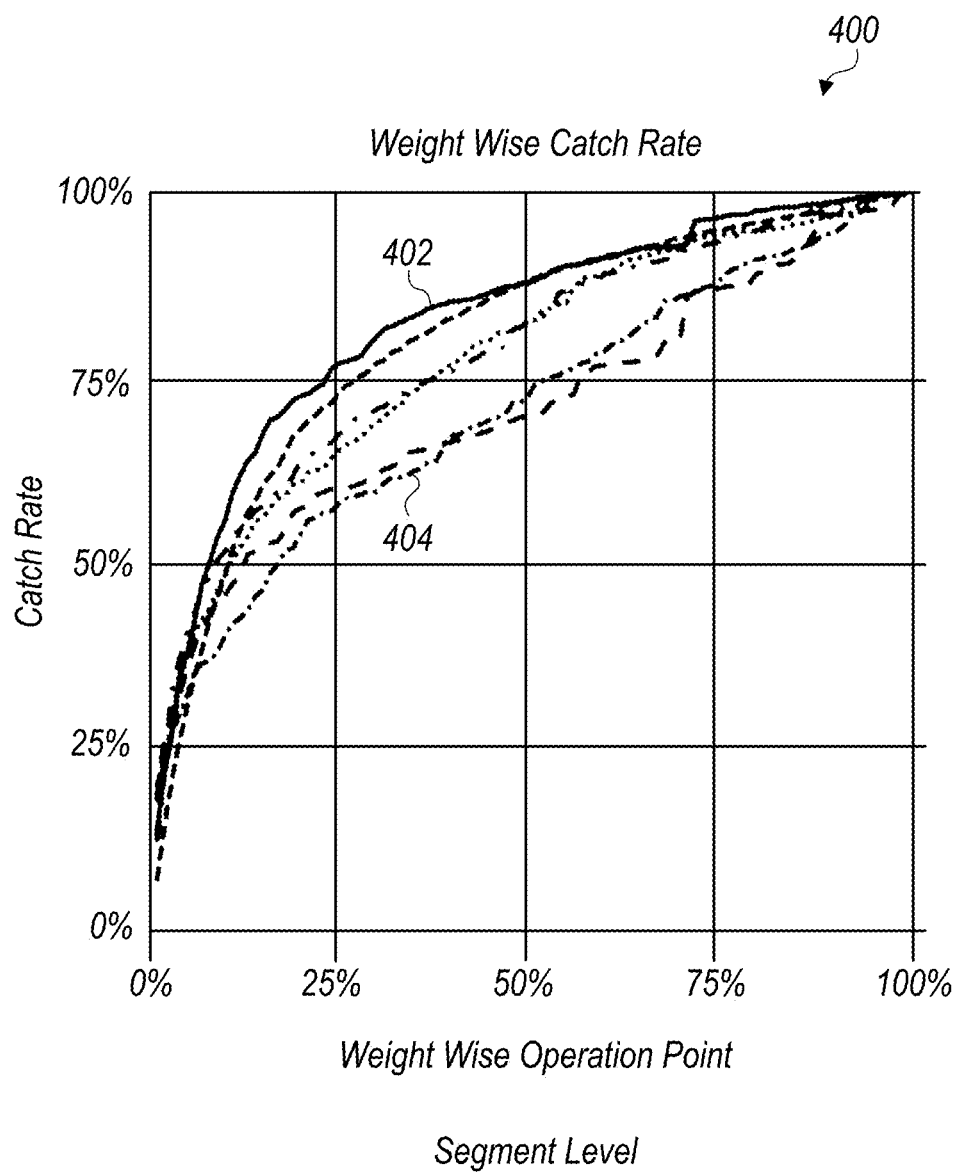
FIG. 4 is a graph depicting exemplary gains charts of the relationship of weight wise operation points to catch rate for a particular dataset in accordance with the disclosed embodiments.

Referring now to FIG. 4, a graph 400 is shown depicting exemplary gains charts of the relationship of weight wise operation points (the x-axis) to catch rate (the y-axis) for a particular dataset 130. The weight wise operation points represented by the x-axis in graph 400 corresponds to the percentages of transactions that are declined at various decision threshold scores. For example, if an operation point is 25%, then 25% of transaction request records are declined at the particular decision threshold score. In various embodiments, the operation point can be weighted (e.g., by a transaction amount). In such an embodiment, if the weighted operation point is 25% (with transaction amount as the weight), this means that 25% of the transaction dollars are declined with the particular decision threshold score. The catch rate represented by the y-axis in graph 400 corresponds to the percentage of transaction requests labeled with a truth label indicating that the particular transaction request should be denied (e.g., transactions labeled being fraudulent) that will be denied at a particular catch rate. However, as the operation point increases, the number of false positives increase. For example, if the operation point is 90%, a significant number of legitimate transaction request will be rejected. Graph 400 includes a plurality of curves in solid, dotted, and dashed lines (including curve 402 and curve 404) corresponding to the relationships between various operation points to catch rate for different segments 230 of dataset 130. For example, an operation point of 25% corresponds to a 76% catch rate for the segment corresponding to curve 402 and a 55% catch rate for the segment corresponding to curve 404. But, an operation point of 50% corresponds to a 70% catch rage for the segment corresponding to curve 404. Accordingly, using linear integer programming to determine segment-level decision thresholds can drive up the overall catch rate without increasing the overall decline rate and/or false positive rate above levels required by constraints 112.

Referring now to FIGS. 5A and 5B, two tables showing exemplary results of an exemplary segment-level optimization of decision threshold scores for a particular database are shown. Overall results 500 are shown in FIG. 5A and segment-level results 510 are shown in FIG. 5B. In the instance corresponding to FIGS. 5A and 5B, the "optimal catch rate" is the resulting catch rate (e.g., that would be visually represented along the y-axis in a gains chart) for the various segment-level decision threshold scores calculated by linear programming computer system 110. In the instance corresponding to FIGS. 5A and 5B, constraints 112 include an overall false positive rate ("FPR") below three false positives per transaction request identified as fraudulent and an overall decline rate below 6% (i.e., no more than 6% of transaction requests are declined). The optimal catch rate, optimal false positive rate, and optimal decline rate shown in overall results 500 have been calculated from dataset 130 using the segment-level decision threshold scores shown in FIG. 5B that have been identified as the maximum decision threshold scores that satisfy constraints 112.

Referring now to FIG. 5B, segment-level results 510 show the segment-level optimal operating points, optimal catch rates, optimal FPR, "bad rate" (i.e., the percentage of transaction request records in each particular segment that have been labeled bad), the percentage of "total bad" (i.e., the percentage all of the transaction request records in dataset 130 that are in each particular segment), the percentage of overall Total Payment Volume (TPV) (i.e., the percentage of total transaction dollars for each particular segment relative to all of dataset 130), and the optimal "cut-off" or decision threshold score in columns 512. In the instance shown in FIG. 5B, there are six segments. For the first segment labeled "Large_HR" the maximum decision threshold score that meets constraints 112 has been calculated to be 315.55 leading to a catch rate of 57.59% with a little more than three false positives per transaction request identified as fraudulent, for example.

Figure 6:
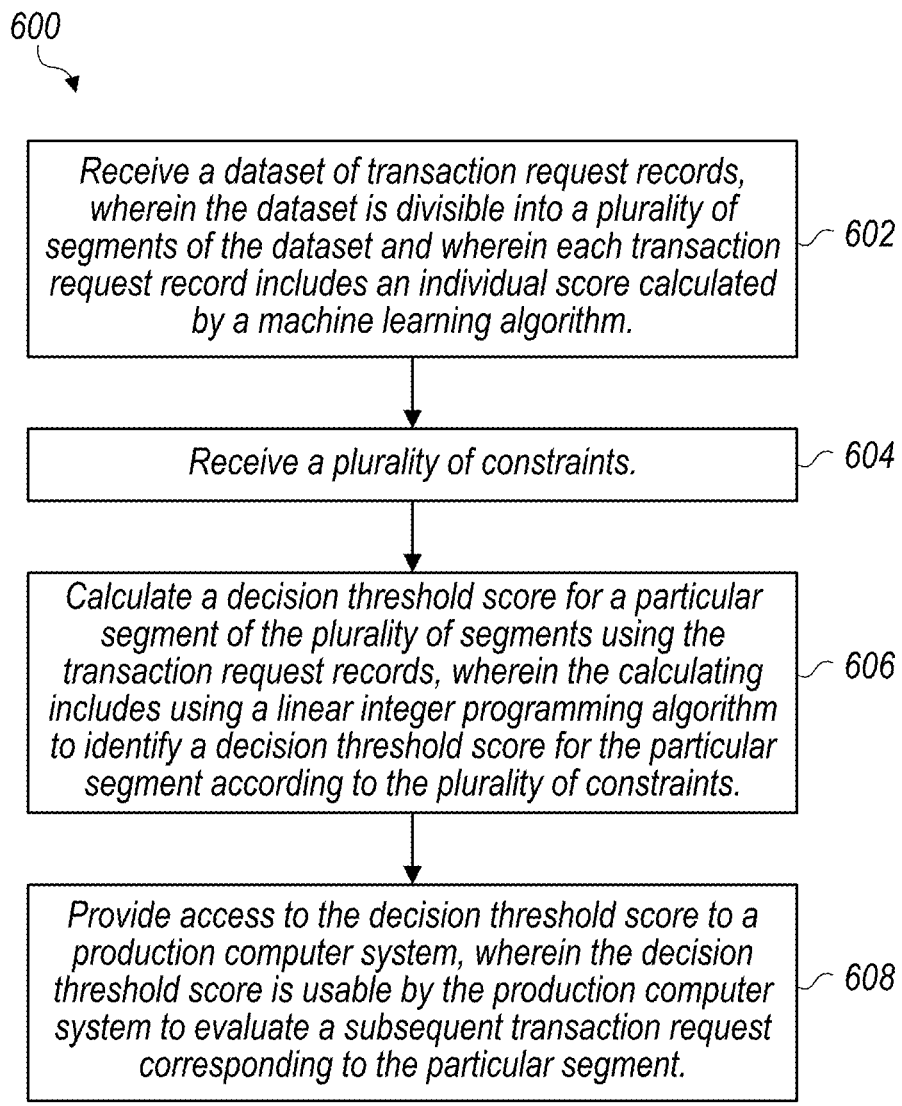
FIG. 6 is flowchart illustrating an embodiment of a decision threshold score calculation method in accordance with the disclosed embodiments.
Figure 7:
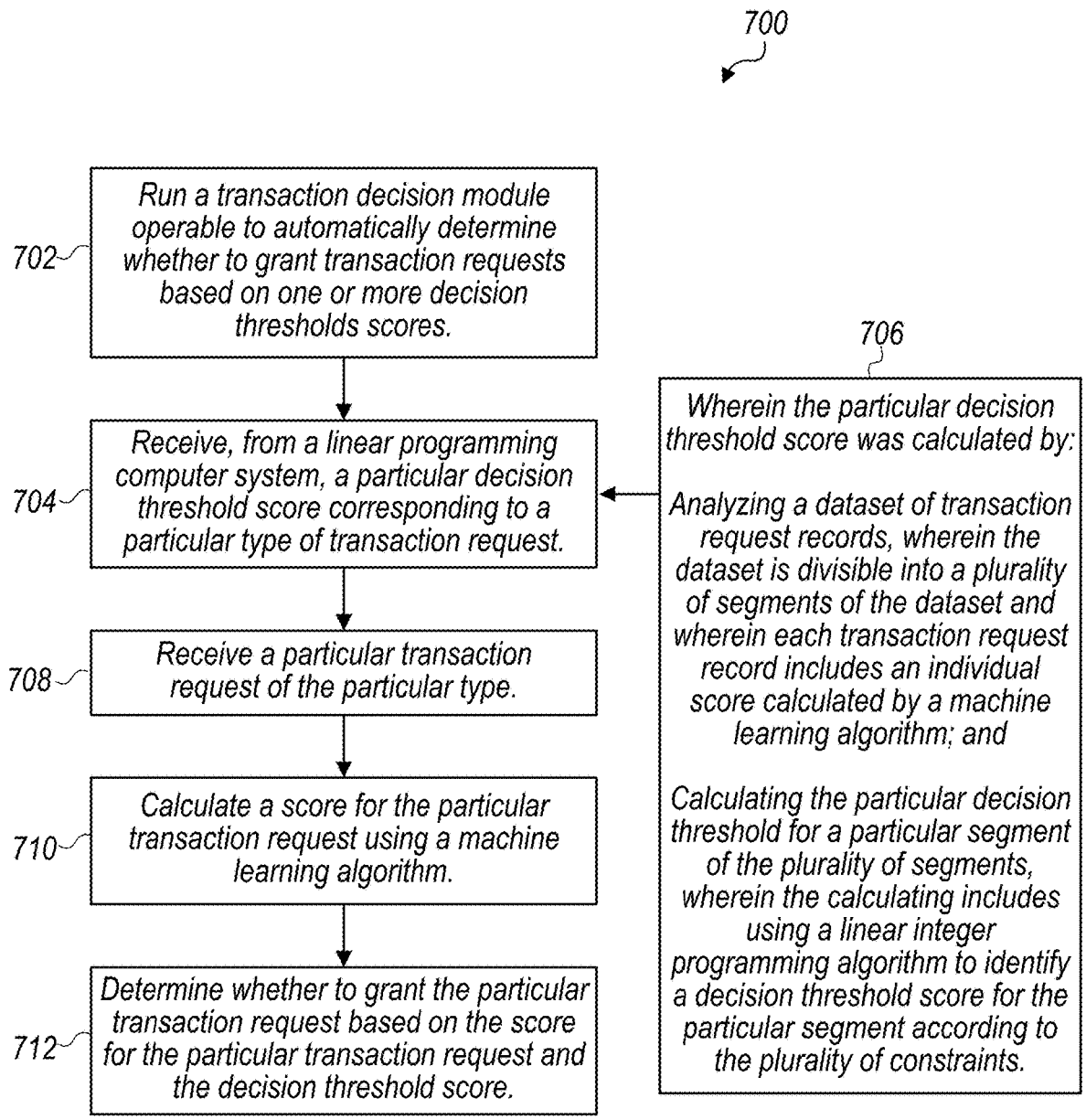
FIG. 7 is flowchart illustrating an embodiment of a transaction request evaluation method in accordance with the disclosed embodiments.

FIGS. 6 and 7 illustrate various flowcharts representing various disclosed methods implemented with computer system 100. Referring now to FIG. 6, a flowchart depicting a decision threshold score calculation method 600 is depicted. In the embodiment shown in FIG. 6, the various actions associated with method 600 are implemented by linear programming computer system 110. At block 602, linear programming computer system 110 receives dataset 130 of transaction request records. Dataset 130 is divisible into a plurality of segments 230 of the dataset 130 and each transaction request record includes an individual score calculated by a machine learning algorithm 126. At block 604, linear programming computer system 110 receives a plurality of constraints 112. At block 606, linear computer system calculates decision threshold score 220 for a particular segment 230 of the plurality of segments using the transaction request records, wherein the calculating includes using linear integer programming algorithm 200 to identify a decision threshold score 220 for the particular segment 230 according to the plurality of constraints 112. At block 608, linear computer system 110 provides access to the decision threshold score 220 to production computer system 120. The decision threshold score 220 is usable by the production computer system 120 to evaluate a subsequent transaction request 122 corresponding to the particular segment 230.

Referring now to FIG. 7, a flowchart depicting a transaction request evaluation method 700 is depicted. In the embodiment shown in FIG. 7, the various actions associated with method 700 are implemented by production computer system 120. At block 702, production computer system runs a transaction decision module 124 operable to automatically determine whether to grant transaction requests based on one or more decision thresholds scores 220. At block 704, production computer system receives from a linear programming computer system, a particular decision threshold score 220 corresponding to a particular type of transaction request. As discussed in block 706, the particular decision threshold score 220 was calculated by a linear programming computer system 110 by: analyzing a dataset of transaction request records, wherein the dataset is divisible into a plurality of segments 230 of the dataset 130 and wherein each transaction request record includes an individual score calculated by machine learning algorithm 126; and calculating the particular decision threshold 220 for a particular segment 230 of the plurality of segments, wherein the calculating includes using a linear integer programming algorithm 200 to identify a decision threshold score 220 for the particular segment 230 according to the plurality of constraints 112. At block 708, production computer system 120 receives a particular transaction request 122 of the particular type. At block 710, production computer system 120 calculates a score for the particular transaction request 122 using machine learning algorithm 126. At block 712, production computer system 120 determine whether to grant the particular transaction request 122 based on the score for the particular transaction request 122 and the decision threshold score 220.

Exemplary Computer System

Figure 8:
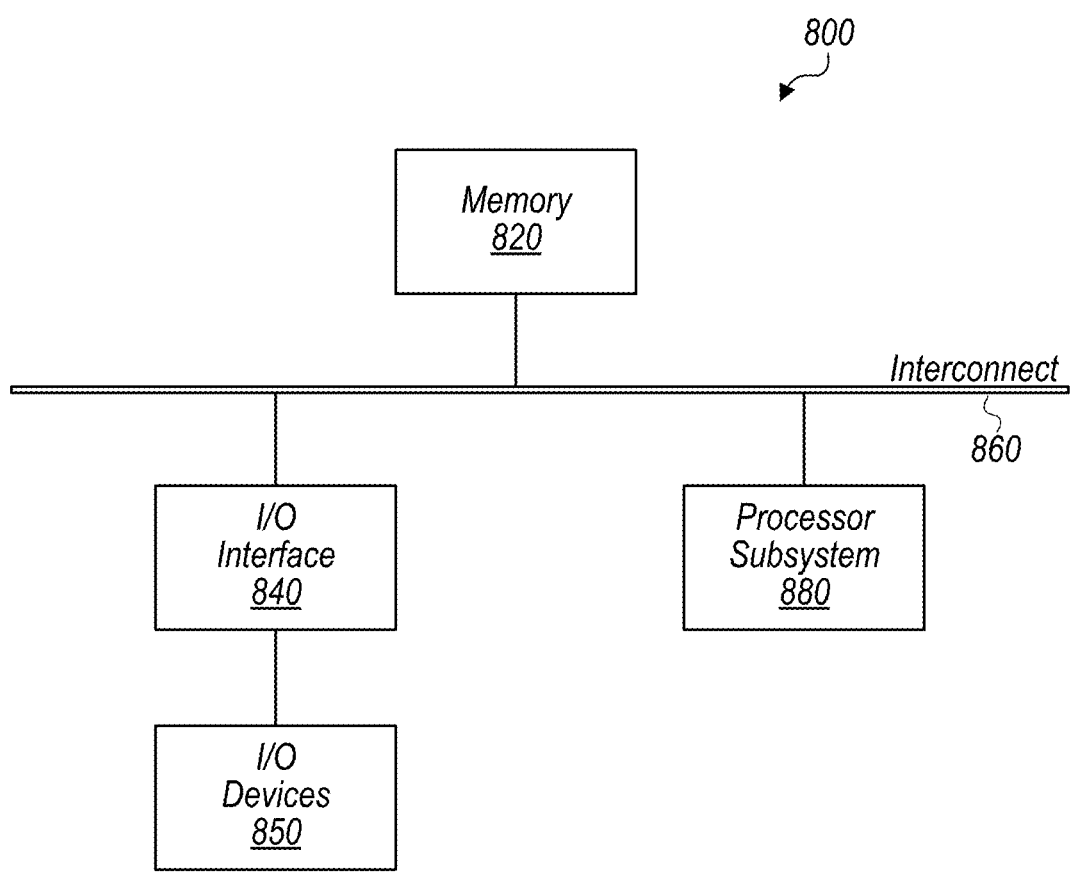
FIG. 8 is a block diagram of an exemplary computer system, which may implement the various components of FIGS. 1 and 2.

Turning now to FIG. 8, a block diagram of an exemplary computer system 800, which may implement the various components of computer system 100 (e.g., linear programming computer system 110, production computer system 120) is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
    training, by a computer system using a dataset including a plurality of transaction request records, a machine learning algorithm, wherein the training includes:
        generating, by the computer system using the machine learning algorithm, individual scores for transaction requests included in the plurality of transaction request records, wherein the individual scores are based on characteristics of the transaction requests, wherein the characteristics include information within the dataset that is descriptive of respective transaction requests;
        dividing, by the computer system using one or more of the characteristics, the dataset into a plurality of segments of the dataset, each segment including a portion of the transaction request records that have one or more of the characteristics in common;

receiving, at the computer system, a plurality of constraints, wherein the plurality of constraints defines operational limits for evaluating subsequent transaction requests;

calculating, by the computer system using a linear integer programming algorithm according to the plurality of constraints:
- a first decision threshold score for a first segment of the plurality of segments using respective individual scores for transaction request records of the first segment; and
- a second decision threshold score, different from the first decision threshold score, for a second segment of the plurality of segments using respective individual scores for transaction request records of the second segment;

receiving, by the computer system, a subsequent transaction request that has not been evaluated;

determining, by the computer system using characteristics of the subsequent transaction request, that the subsequent transaction request corresponds to the first segment; and evaluating, using the machine learning algorithm and the first decision threshold score, the subsequent transaction request, wherein the evaluating includes:
- determining a particular individual score for the subsequent transaction request; and
- approving the subsequent transaction request in response to determining that the particular individual score satisfies the first decision threshold score.

2. The method of claim 1, wherein using the linear integer programming algorithm to calculate respective ones of the first and second decision threshold scores includes:
- projecting a plurality of performance indicators for transaction request records corresponding to the respective first and second segments for each of a plurality of candidate decision threshold scores that satisfy the constraints; and
- identifying, as the respective first and second decision threshold scores, the maximum candidate decision threshold score that satisfies the constraints.

3. The method of claim 1, wherein the individual scores are fraud risk scores and the first and second decision threshold scores are minimum fraud risk score thresholds.

4. The method of claim 1, wherein the plurality of constraints includes:
- a transaction decline rate;
- a catch rate; and
- a false positive rate.

5. The method of claim 1, wherein the plurality of constraints includes a global decline rate for the dataset and respective segment decline rates for the first and second segments.

6. The method of claim 1, wherein each transaction request record is associated with a respective account and the dataset is divisible by levels of account activity.

7. The method of claim 1, wherein calculating the respective first and second decision threshold scores includes:
- calculating results for each of a plurality of candidate decision thresholds for each constraint; and
- using linear integer programming to select an optimal candidate decision threshold for which the calculated results satisfy the constraints.

8. The method of claim 7, wherein the constraints include a transaction decline rate and a catch rate, and wherein calculating the results for each of the plurality of candidate decision thresholds includes calculating a transaction decline result and a catch result for each candidate decision threshold.

9. A non-transitory, computer-readable medium storing instructions that when executed by a computer system cause the computer system to perform operations comprising:
training, using a dataset including a plurality of transaction request records, a machine learning algorithm to determine whether to grant transaction requests included in the plurality of transaction request records based on characteristics of the transaction requests, wherein the characteristics include information within the dataset that is descriptive of respective transaction requests, and wherein the training includes:
- dividing the dataset, based on ones of the characteristics that are common to a subset of the transaction requests, into a plurality of segments of the dataset, and wherein each transaction request record includes an indication of whether the corresponding transaction request was granted;

receiving a plurality of constraints, wherein the plurality of constraints defines operational limits for evaluating subsequent transaction requests;

calculating, using a linear integer programming algorithm according to the plurality of constraints:
- a first decision threshold score for a first segment of the plurality of segments using the respective indications for transaction request records of the first segment; and
- a second decision threshold score, different from the first decision threshold score, for a second segment of the plurality of segments using the respective indications for transaction request records of the second segment;

receiving a subsequent transaction request that has not been evaluated;

determining, using characteristics of the subsequent transaction request, that the subsequent transaction request corresponds to the first segment; and evaluating, using the machine learning algorithm and the first decision threshold score, the subsequent transaction request, wherein the evaluating includes:
- determining a particular score for the subsequent transaction request; and
- approving the subsequent transaction request in response to determining that the particular score satisfies the first decision threshold score.

10. The computer-readable medium of claim 9, wherein using the linear integer programming algorithm to calculate a given decision threshold score includes:
- projecting a plurality of performance indicators for transaction request records corresponding to the respective first and second segments for each of a plurality of candidate decision threshold scores that satisfy the constraints; and
- identifying, as the respective first and second decision threshold scores, the maximum candidate decision threshold score that satisfies the constraints.

11. The computer-readable medium of claim 9, wherein each transaction request record includes individual scores that are fraud risk scores and wherein the first and second decision threshold scores are minimum fraud risk score thresholds.

12. The computer-readable medium of claim 9, wherein the plurality of constraints includes:
- a transaction decline rate;
- a catch rate; and
- a false positive rate.

13. The computer-readable medium of claim 9, wherein the plurality of constraints includes a global catch rate for the dataset and respective segment catch rates for the first and second segments.

14. The computer-readable medium of claim 9, wherein each transaction request record is associated with a respective geographic area and the dataset is divisible by geographic areas.

15. The computer-readable medium of claim 9, wherein calculating the respective first and second decision threshold scores includes:
   calculating results for each of a plurality of candidate decision thresholds for each constraint; and
   using linear integer programming to select an optimal candidate decision threshold for which the calculated results satisfy the constraints.

16. A method comprising:
   training, on a production computer system using a dataset including a plurality of transaction request records, a machine learning algorithm for a transaction decision module operable to automatically determine whether to grant transaction requests included in the transaction request records based on one or more decision thresholds scores;
   receiving, at the production computer system from a computer system, a first decision threshold score corresponding to a first type of transaction request and a second decision threshold score, different from the first decision threshold score, corresponding to a second type of transaction request, wherein the first and second decision threshold scores are calculated by:
      analyzing the dataset, wherein the dataset is divided into a plurality of segments of the dataset, each segment including a portion of the transaction request records that have one or more characteristics in common, wherein the one or more characteristics include information within the dataset that is descriptive of respective transaction request records, and wherein each transaction request record includes an individual score calculated by the machine learning algorithm; and
      calculating, by the computer system using a linear integer programming algorithm according to a plurality of constraints:
         the first decision threshold score for a first segment of the plurality of segments; and
         the second decision threshold score for a second segment of the plurality of segments;
   receiving, at the production computer system, a first transaction request of the first type and a second transaction request of the second type;
   calculating, by the production computer system using the machine learning algorithm, respective scores for the first and second transaction requests;
   determining, by the production computer system, whether to grant the first transaction request based on the score for the first transaction request and the first decision threshold score; and
   determining, by the production computer system, whether to grant the second transaction request based on the score for the second transaction request and the second decision threshold score.

17. The method of claim 16,
   wherein the machine learning algorithm is trained prior to receiving the first and second transaction requests; and
   wherein the machine learning algorithm is not retrained in response to determining whether to grant the first and second transaction requests.

18. The method of claim 16, wherein using the linear integer programming algorithm to calculate respective ones of the first and second decision threshold scores includes:
   projecting a plurality of performance indicators for transaction request records corresponding to the respective first and second segments for each of a plurality of candidate decision threshold scores that satisfy the plurality of constraints; and
   identifying, as the respective first and second decision threshold scores, the maximum candidate decision threshold score that satisfies the plurality of constraints.

19. The method of claim 16, wherein the respective scores for the first and second transaction requests are fraud risk scores and the first and second decision threshold scores are minimum fraud risk score thresholds.

20. The method of claim 16, wherein the plurality of constraints includes:
   a transaction decline rate;
   a catch rate; and
   a false positive rate.

* * * * *